US012412591B2

(12) United States Patent
Gao et al.

(10) Patent No.: US 12,412,591 B2
(45) Date of Patent: Sep. 9, 2025

(54) VOICE PROCESSING METHOD AND ELECTRONIC DEVICE

(71) Applicant: Beijing Honor Device Co., Ltd., Beijing (CN)

(72) Inventors: Haikuan Gao, Beijing (CN); Zhenyi Liu, Beijing (CN); Zhichao Wang, Beijing (CN); Jianyong Xuan, Beijing (CN); Risheng Xia, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 47 days.

(21) Appl. No.: 18/279,475

(22) PCT Filed: May 16, 2022

(86) PCT No.: PCT/CN2022/093168
§ 371 (c)(1),
(2) Date: Aug. 30, 2023

(87) PCT Pub. No.: WO2023/016018
PCT Pub. Date: Feb. 16, 2023

(65) Prior Publication Data

US 2024/0144951 A1 May 2, 2024

(30) Foreign Application Priority Data

Aug. 12, 2021 (CN) ......................... 202110925923.8

(51) Int. Cl.
*G10L 21/0232* (2013.01)
*G10L 21/0208* (2013.01)
*G10L 21/0216* (2013.01)

(52) U.S. Cl.
CPC ..................... *G10L 21/0232* (2013.01); *G10L 2021/02082* (2013.01); *G10L 2021/02161* (2013.01)

(58) Field of Classification Search
None
See application file for complete search history.

(56) References Cited

U.S. PATENT DOCUMENTS 9,008,329 B1 * 4/2015 Mandel .................. G10K 15/00
704/226
9,401,158 B1 7/2016 Yen et al.
(Continued)

FOREIGN PATENT DOCUMENTS

CA 2386653 A1 4/2001
CN 105427861 A 3/2016
(Continued)

OTHER PUBLICATIONS

O. Schwartz, S. Gannot and E. A. P. Habets, "Multi-Microphone Speech Dereverberation and Noise Reduction Using Relative Early Transfer Functions," in IEEE/ACM Transactions on Audio, Speech, and Language Processing, vol. 23, No. 2, pp. 240-251, Feb. 2015.
(Continued)

*Primary Examiner* — Douglas Godbold
(74) *Attorney, Agent, or Firm* — WOMBLE BOND DICKINSON (US) LLP

(57) ABSTRACT

A voice processing method is provided. The method includes: An electronic device first performs de-reverberation processing on a first frequency domain signal to obtain a second frequency domain signal, performs noise reduction processing on the first frequency domain signal to obtain a third frequency domain signal, and then performs, based on a first voice feature of the second frequency domain signal and a second voice feature of the third frequency domain signal, fusion processing on the second frequency domain signal and the third frequency domain signal that belong to a same channel of first frequency domain signal, to obtain a fused frequency domain signal. In this case, background noise in the fused frequency domain signal is not damaged,
(Continued)

thereby effectively ensuring stable background noise of a voice signal obtained after voice processing. In addition, an electronic device, a chip system, and a computer-readable storage medium are provided.

20 Claims, 7 Drawing Sheets

(56) References Cited

U.S. PATENT DOCUMENTS

| | | | | |
|---|---|---|---|---|
| 10,629,194 | B2 | 4/2020 | Song | |
| 12,272,369 | B1 * | 4/2025 | Chhetri | H04M 9/08 |
| 2012/0051548 | A1 * | 3/2012 | Visser | H04R 3/005 381/56 |
| 2012/0185247 | A1 | 7/2012 | Tzirkel-Hancock et al. | |
| 2015/0334489 | A1 | 11/2015 | Iyengar et al. | |
| 2018/0330726 | A1 | 11/2018 | Song | |
| 2019/0318757 | A1 * | 10/2019 | Chen | G10L 19/022 |
| 2020/0075012 | A1 | 3/2020 | Tian et al. | |
| 2020/0286501 | A1 * | 9/2020 | Xiao | G10L 21/0208 |
| 2021/0134312 | A1 | 5/2021 | Koishida et al. | |
| 2021/0176558 | A1 | 6/2021 | Li et al. | |
| 2021/0319802 | A1 | 10/2021 | Bai | |
| 2022/0230651 | A1 | 7/2022 | Zhu et al. | |
| 2023/0403505 | A1 * | 12/2023 | Yu | G10L 21/02 |
| 2024/0144948 | A1 * | 5/2024 | Xuan | H04N 23/631 |
| 2024/0290338 | A1 * | 8/2024 | Huang | G10L 25/30 |

FOREIGN PATENT DOCUMENTS

| | | | |
|---|---|---|---|
| CN | 105635500 | A | 6/2016 |
| CN | 105825865 | A | 8/2016 |
| CN | 107316648 | A | 11/2017 |
| CN | 107316649 | A | 11/2017 |
| CN | 109195043 | A | 1/2019 |
| CN | 109979476 | A | 7/2019 |
| CN | 110197669 | A | 9/2019 |
| CN | 110211602 | A | 9/2019 |
| CN | 110310655 | A | 10/2019 |
| CN | 110648684 | A | 1/2020 |
| CN | 110827791 | A | 2/2020 |
| CN | 111161751 | A | 5/2020 |
| CN | 111223493 | A | 6/2020 |
| CN | 111312273 | A | 6/2020 |
| CN | 111345047 | A | 6/2020 |
| CN | 111489760 | A | 8/2020 |
| CN | 111599372 | A | 8/2020 |
| CN | 112420073 | A | 2/2021 |
| CN | 113823314 | A | 12/2021 |

OTHER PUBLICATIONS

I. Kodrasi and S. Doclo, "Joint Dereverberation and Noise Reduction Based on Acoustic Multi-Channel Equalization," in IEEE/ACM Transactions on Audio, Speech, and Language Processing, vol. 24, No. 4, pp. 680-693, Apr. 2016.

B. J. Borgström and M. S. Brandstein, "Speech Enhancement via Attention Masking Network (SEAMNET): An End-to-End System for Joint Suppression of Noise and Reverberation," in IEEE/ACM Transactions on Audio, Speech, and Language Processing, vol. 29, pp. 515-526, 2021.

Lan Tian et al: "An Overview of Monaural Speech Denoising and Dereverberation Research", Computer Research and Development . 2020,57(05), total 26 pages.

Liu et al: "A Research to Speech Dereverberation Method Based on BISTM Recurrent Neural Networks and Non-negative Matrix Factorization", Signal processing . 2017,33(03), total 5 pages.

H. Li, X. Zhang and G. Gao, "Robust Speech Dereverberation Based on WPE and Deep Learning," 2020 Asia-Pacific Signal and Information Processing Association Annual Summit and Conference (APSIPA ASC), Auckland, New Zealand, 2020, pp. 52-56.

* cited by examiner

VOICE PROCESSING METHOD AND ELECTRONIC DEVICE

CROSS-REFERENCE TO RELATED APPLICATIONS

This application is a national stage of International Application No. PCT/CN2022/093168, filed on May 16, 2022, which claims priority to Chinese Patent Application No. 202110925923.8, filed on Aug. 12, 2021. The disclosures of both of the aforementioned applications are hereby incorporated by reference in their entireties.

TECHNICAL FIELD

This application relates to the field of voice processing, and in particular, to a voice processing method and an electronic device.

BACKGROUND

As current office and use scenarios are diversified, the recording demand for products with recording functions such as a mobile phone, a tablet computer, and a PC has increased. Performance of the recording function of the product affects evaluation of a user on the product, and a de-reverberation effect is one of indicators for evaluation.

In the conventional technology, a de-reverberation optimization solution is an adaptive filter solution. In this solution, a frequency spectrum of stable background noise is damaged when voice reverberation is removed, and consequently, stability of the background noise is affected, and a voice obtained after de-reverberation is unstable.

SUMMARY

This application provides a voice processing method and an electronic device. The electronic device can process a voice signal to obtain a fused frequency domain signal without damaging background noise, thereby effectively ensuring stable background noise of a voice signal obtained after voice processing.

According to a first aspect, this application provides a voice processing method, applied to an electronic device. The electronic device includes n microphones, where n is greater than or equal to 2. The method includes: performing Fourier transform on voice signals picked up by the n microphones to obtain n channels of corresponding first frequency domain signals S, where each channel of first frequency domain signal S has M frequencies, and M is a quantity of transform points used when the Fourier transform is performed; performing de-reverberation processing on the n channels of first frequency domain signals S to obtain n channels of second frequency domain signals $S_E$, and performing noise reduction processing on the n channels of first frequency domain signals S to obtain n channels of third frequency domain signals $S_S$; determining a first voice feature corresponding to M frequencies of a second frequency domain signal $S_{Ei}$ corresponding to a first frequency domain signal $S_i$ and a second voice feature corresponding to M frequencies of a third frequency domain signal $S_{Si}$ corresponding to the first frequency domain signal $S_i$, and obtaining M target amplitude values corresponding to the first frequency domain signal $S_i$ based on the first voice feature, the second voice feature, the second frequency domain signal $S_{Ei}$, and the third frequency domain signal $S_{Si}$, where i=1, 2, . . . , or n, the first voice feature is used to represent a de-reverberation degree of the second frequency domain signal $S_{Ei}$, and the second voice feature is used to represent a noise reduction degree of the third frequency domain signal $S_{Si}$; and determining a fused frequency domain signal corresponding to the first frequency domain signal $S_i$ based on the M target amplitude values.

By implementing the method of the first aspect, the electronic device first performs de-reverberation processing on the first frequency domain signal to obtain the second frequency domain signal, performs noise reduction processing on the first frequency domain signal to obtain the third frequency domain signal, and then performs, based on the first voice feature of the second frequency domain signal and the second voice feature of the third frequency domain signal, fusion processing on the second frequency domain signal and the third frequency domain signal that belong to a same channel of first frequency domain signal, to obtain the fused frequency domain signal. In this case, background noise in the fused frequency domain signal is not damaged, thereby effectively ensuring stable background noise of a voice signal obtained after voice processing.

With reference to the first aspect, in an implementation, the obtaining M target amplitude values corresponding to the first frequency domain signal $S_i$ based on the first voice feature, the second voice feature, the second frequency domain signal $S_{Ei}$, and the third frequency domain signal $S_{Si}$ specifically includes: when it is determined that the first voice feature and the second voice feature that correspond to a frequency $A_i$ in the M frequencies meet a first preset condition, determining a first amplitude value corresponding to a frequency $A_i$ in the second frequency domain signal $S_{Ei}$ as a target amplitude value corresponding to the frequency $A_i$, or determining the target amplitude value corresponding to the frequency $A_i$ based on the first amplitude value and a second amplitude value corresponding to a frequency $A_i$ in the third frequency domain signal $S_{Si}$, where i=1, 2, . . . , or M; or when it is determined that the first voice feature and the second voice feature that correspond to the frequency $A_i$ do not meet the first preset condition, determining the second amplitude value as the target amplitude value corresponding to the frequency $A_i$.

In the foregoing embodiment, the first preset condition is used for fusion determining, to determine the target amplitude value corresponding to the frequency $A_i$ based on the first amplitude value corresponding to the frequency $A_i$ in the second frequency domain signal $S_{Ei}$ and the second amplitude value corresponding to the frequency $A_i$ in the third frequency domain signal $S_{Si}$. When the frequency $A_i$ meets the first preset condition, the first amplitude value can be determined as the target amplitude value corresponding to the frequency $A_i$, or the target amplitude value corresponding to the frequency $A_i$ can be determined based on the first amplitude value and the second amplitude value. However, when the frequency $A_i$ does not meet the first preset condition, the second amplitude value can be determined as the target amplitude value corresponding to the frequency $A_i$.

With reference to the first aspect, in an implementation, the determining the target amplitude value corresponding to the frequency $A_i$ based on the first amplitude value and a second amplitude value corresponding to a frequency $A_i$ in the third frequency domain signal $S_{Si}$ specifically includes: determining a first weighted amplitude value based on the first amplitude value corresponding to the frequency $A_i$ and a corresponding first weight; determining a second weighted amplitude value based on the second amplitude value corresponding to the frequency $A_i$ and a corresponding second weight; and determining a sum of the first weighted amplitude value and the second weighted amplitude value as the target amplitude value corresponding to the frequency $A_i$.

In the foregoing embodiment, the target amplitude value corresponding to the frequency $A_i$ is obtained based on the first amplitude value and the second amplitude value by using a weighted operation principle, thereby implementing de-reverberation and ensuring stable background noise.

With reference to the first aspect, in an implementation, the first voice feature includes a first dual-microphone correlation coefficient and a first frequency energy value, and the second voice feature includes a second dual-microphone correlation coefficient and a second frequency energy value; the first dual-microphone correlation coefficient is used to represent a signal correlation degree between the second frequency domain signal $S_{Ei}$ and a second frequency domain signal $S_{Et}$ at corresponding frequencies, and the second frequency domain signal $S_{Et}$ is any channel of second frequency domain signal $S_E$ other than the second frequency domain signal $S_{Ei}$ in the n channels of second frequency domain signals $S_E$; and the second dual-microphone correlation coefficient is used to represent a signal correlation degree between the third frequency domain signal $S_{Si}$ and a third frequency domain signal $S_{St}$ at corresponding frequencies, and the third frequency domain signal $S_{St}$ is a third frequency domain signal $S_S$ that is in the n channels of third frequency domain signals $S_S$ and that corresponds to a same first frequency domain signal as the second frequency domain signal $S_{Et}$. Further, the first preset condition is that the first dual-microphone correlation coefficient and the second dual-microphone correlation coefficient of the frequency $A_i$ meet a second preset condition, and the first frequency energy value and the second frequency energy value of the frequency $A_i$ meet a third preset condition.

In the foregoing embodiment, the first preset condition includes the second preset condition related to the dual-microphone correlation coefficients and the third preset condition related to the frequency energy values, and fusion determining is performed based on the dual-microphone correlation coefficients and the frequency energy values, so that fusion of the second frequency domain signal and the third frequency domain signal is more accurate.

With reference to the first aspect, in an implementation, the second preset condition is that a first difference of the first dual-microphone correlation coefficient of the frequency $A_i$ minus the second dual-microphone correlation coefficient of the frequency $A_i$ is greater than a first threshold; and the third preset condition is that a second difference of the first frequency energy value of the frequency $A_i$ minus the second frequency energy value of the frequency $A_i$ is less than a second threshold.

In the foregoing embodiment, when the frequency $A_i$ meets the second preset condition, it can be considered that a de-reverberation effect is obvious, and a voice component is greater than a noise reduction component to a specific extent after de-reverberation. When the frequency $A_i$ meets the third preset condition, it is considered that energy obtained after de-reverberation is less than energy obtained after noise reduction to a specific extent, and it is considered that more unwanted signals are removed from the second frequency domain signals after de-reverberation.

With reference to the first aspect, in an implementation, a de-reverberation processing method includes a de-reverberation method based on a coherent-to-diffuse power ratio or a de-reverberation method based on a weighted prediction error.

In the foregoing embodiment, two de-reverberation methods are provided, so that a reverberation signal can be effectively removed from the first frequency domain signals.

With reference to the first aspect, in an implementation, the method further includes: performing inverse Fourier transform on the fused frequency domain signal to obtain a fused voice signal.

With reference to the first aspect, in an implementation, before the Fourier transform is performed on the voice signals, the method further includes: displaying a shooting interface, where the shooting interface includes a first control; detecting a first operation performed on the first control; and in response to the first operation, performing video shooting by the electronic device to obtain a video that includes the voice signals.

In the foregoing embodiment, in terms of obtaining the voice signals, the electronic device can obtain the voice signals through video recording.

With reference to the first aspect, in an implementation, before the Fourier transform is performed on the voice signals, the method further includes: displaying a recording interface, where the recording interface includes a second control; detecting a second operation performed on the second control; and in response to the second operation, performing recording by the electronic device to obtain the voice signals.

In the foregoing embodiment, in terms of obtaining the voice signals, the electronic device can also obtain the voice signals through recording.

According to a second aspect, this application provides an electronic device. The electronic device includes one or more processors and one or more memories, where the one or more memories are coupled to the one or more processors, the one or more memories are configured to store computer program code, the computer program code includes computer instructions, and when the one or more processors execute the computer instructions, the electronic device is enabled to perform the method according to the first aspect or any implementation of the first aspect.

According to a third aspect, this application provides a chip system. The chip system is applied to an electronic device, the chip system includes one or more processors, and the processor is configured to invoke computer instructions to enable the electronic device to perform the method according to the first aspect or any implementation of the first aspect.

According to a fourth aspect, this application provides a computer-readable storage medium, including instructions, where when the instructions are run on an electronic device, the electronic device is enabled to perform the method according to the first aspect or any implementation of the first aspect.

According to a fifth aspect, an embodiment of this application provides a computer program product including instructions, where when the computer program product runs on an electronic device, the electronic device is enabled to perform the method according to the first aspect or any implementation of the first aspect.

DESCRIPTION OF EMBODIMENTS

Figure 1:
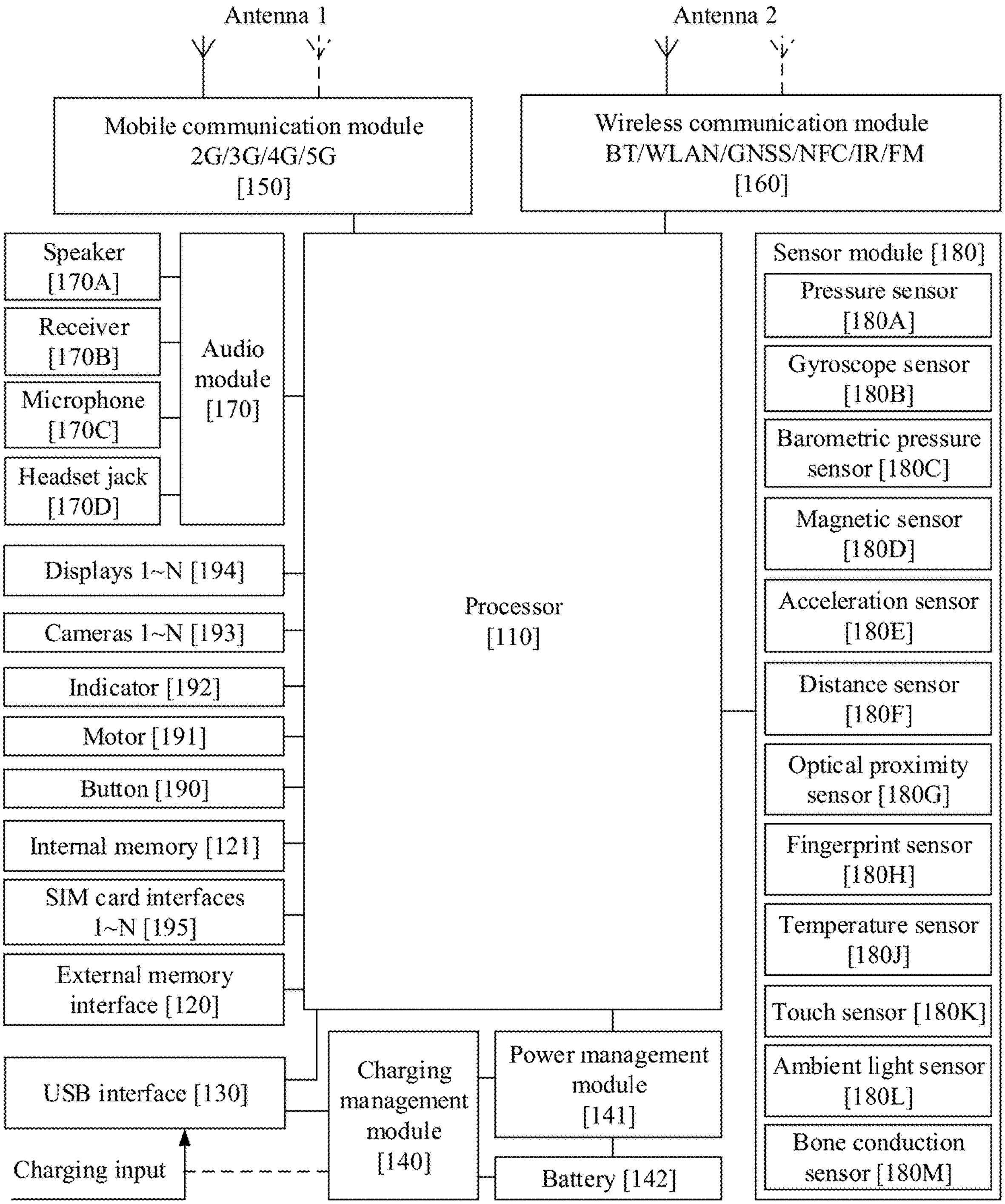
FIG. 1 is a schematic diagram of a structure of an electronic device according to an embodiment of this application.

Terms used in the following embodiments of this application are merely intended to describe specific embodiments, but not intended to limit this application. As used in this specification and the claims of this application, singular expressions "one", "a", "the", "foregoing", and "this" are intended to include plural expressions, unless otherwise clearly specified in the context. It should be further understood that the term "and/or" used in this application indicates and includes any or all possible combinations of one or more listed items.

The following terms "first" and "second" are merely intended for descriptive purposes, and shall not be understood as an implication or implication of relative importance or an implicit indication of a quantity of indicated technical features. Therefore, features defined with "first" and "second" may explicitly or implicitly include one or more features. In the descriptions of the embodiments of this application, unless otherwise specified, "a plurality of" means two or more.

Because the embodiments of this application relate to a voice processing method, the following first describes related terms and concepts in the embodiments of this application for ease of understanding.

(1) Reverberation

Sound waves are reflected by obstacles such as a wall, a ceiling, and a floor when being propagated indoors, and some of the sound waves are absorbed by the obstacles each time the sound waves are reflected. In this way, after a sound source stops making sound, the sound waves are reflected and absorbed indoors a plurality of times before finally disappearing. Several mixed sound waves can still be felt for a period of time after the sound source stops making sound (a sound continuation phenomenon still exists indoors after the sound source stops making sound). This phenomenon is referred to as reverberation, and this period of time is referred to as a reverberation time.

(2) Background Noise

Background noise is also referred to as background noise. Usually, the background noise refers to any interference that is unrelated to existence of a signal in a generation, checking, measurement, or recording system. However, in industrial noise or ambient noise measurement, the background noise refers to noise of a surrounding environment other than a measured noise source. For example, when noise measurement is performed for a street near a factory, noise of the factory is background noise if traffic noise is measured. Alternatively, the traffic noise is background noise if the noise of the factory is measured.

(3) WPE

A main idea of a de-reverberation method based on a weighted prediction error (Weighted prediction error, WPE) is as follows: A reverberation tail part of a signal is first estimated, and then the reverberation tail part is removed from an observation signal, to obtain an optimal estimation of a weak reverberation signal in a maximum likelihood sense to implement de-reverberation.

(4) CDR

A main idea of a de-reverberation method based on a coherent-to-diffuse power ratio (Coherent-to-Diffuse power Ratio, CDR) is as follows: De-reverberation processing is performed on a voice signal based on coherence.

With reference to the foregoing terms, the following describes a voice processing method of an electronic device in some embodiments and a voice processing method in the embodiments of this application.

In the conventional technology, because a part of background noise is filtered out in a used de-reverberation technology (for example, filter filtering), background noise of a voice obtained after de-reverberation is unstable, and auditory comfort of the voice obtained after de-reverberation is affected.

Therefore, an embodiment of this application provides a voice processing method. In the method, de-reverberation processing is first performed on a first frequency domain signal corresponding to a voice signal to obtain a second frequency domain signal, noise reduction processing is performed on the first frequency domain signal to obtain a third frequency domain signal, and then fusion processing is performed, based on a first voice feature of the second frequency domain signal and a second voice feature of the third frequency domain signal, on the second frequency domain signal and the third frequency domain signal that belong to a same channel of first frequency domain signal, to obtain a fused frequency domain signal. Because background noise in the fused frequency domain signal is not damaged, stable background noise of a processed voice signal can be effectively ensured, and auditory comfort of a processed voice is ensured.

The following first describes an example of an electronic device provided in an embodiment of this application.

FIG. 1 is a schematic diagram of a structure of an electronic device according to an embodiment of this application.

The embodiments are specifically described below by using the electronic device as an example. It should be understood that the electronic device may have more or fewer components than those shown in FIG. 1, may combine two or more components, or may have different component configurations. The components shown in FIG. 1 may be implemented by hardware that includes one or more signal processing and/or application-specific integrated circuits, software, or a combination of hardware and software.

The electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a multispectral sensor (not shown), and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices or may be integrated into one or more processors.

The controller may be a nerve center and a command center of the electronic device. The controller may generate an operation control signal based on instruction operation code and a sequence signal, to complete control of instruction fetching and instruction execution.

A memory may be further disposed in the processor 110, to store instructions and data. In some embodiments, the memory in the processor 110 is a cache memory. The memory may store instructions or data that is recently used or cyclically used by the processor 110. If the processor 110 needs to use the instructions or the data again, the processor 110 may directly invoke the instructions or the data from the memory. This avoids repeated access and reduces a waiting time of the processor 110, thereby improving efficiency of a system.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (derial clock line, SCL).

The I2S interface may be used for audio communication.

The PCM interface may also be used for audio communication, to sample, quantize, and encode an analog signal.

The UART interface is a universal serial data bus used for asynchronous communication. The bus may be a bidirectional communication bus. The bus converts to-be-transmitted data between serial communication and parallel communication.

The MIPI interface may be configured to connect the processor 110 and peripheral devices such as the display 194 and the camera 193. The MIPI interface includes a camera serial interface (camera serial interface, CSI), a display serial interface (display serial interface, DSI), and the like.

The GPIO interface may be configured by using software. The GPIO interface may be configured as a control signal or may be configured as a data signal.

The SIM interface may be configured to communicate with the SIM card interface 195, to implement a function of transmitting data to an SIM card or reading data from an SIM card.

The USB interface 130 is an interface that complies with USB standard specifications, and may be specifically a Mini USB interface, a Micro USB interface, a USB Type C interface, or the like.

It may be understood that an interface connection relationship between the modules illustrated in this embodiment of the present invention is an example for description, and does not constitute a limitation on the structure of the electronic device. In some other embodiments of this application, the electronic device may alternatively use an interface connection manner that is different from that in the foregoing embodiment, or use a combination of a plurality of interface connection manners.

The charging management module 140 is configured to receive a charging input from a charger.

The power management module 141 is configured to connect the battery 142, the charging management module 140, and the processor 110, to supply power to an external memory, the display 194, the camera 193, the wireless communication module 160, and the like.

A wireless communication function of the electronic device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device may be configured to cover one or more communication frequency bands. Different antennas may be further multiplexed to increase antenna utilization.

The mobile communication module 150 may provide a solution to wireless communication such as 2G/3G/4G/5G applied to the electronic device. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit a processed electromagnetic wave to the modem processor for demodulation. The mobile communication module 150 may further amplify a signal obtained after modulation by the modem processor, and convert the signal into an electromagnetic wave for radiation by using the antenna 1.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (not limited to the speaker 170A or the receiver 170B), or displays an image or a video by using the display 194. In some embodiments, the modem processor may be a separate device. In some other embodiments, the modem processor may be independent of the processor 110, and the modem processor and the mobile communication module 150 or another functional module are disposed in a same device.

The wireless communication module 160 may provide a solution to wireless communication that is applied to the electronic device and that includes a wireless local area network (wireless local area networks, WLAN) (for example, a wireless fidelity (wireless fidelity, Wi-Fi) network), Bluetooth (bluetooth, BT), infrared (infrared, IR), and the like.

In some embodiments, the antenna 1 and the mobile communication module 150 in the electronic device are coupled, and the antenna 2 and the wireless communication module 160 are coupled, so that the electronic device can communicate with a network and another device by using a wireless communication technology. The wireless communication technology may include a global system for mobile communications (global system for mobile communications, GSM), a general packet radio service (general packet radio service, GPRS), and the like.

The electronic device implements a display function by using the GPU, the display 194, the application processor, and the like. The GPU is a microprocessor for image processing and is connected to the display 194 and the application processor. The GPU is configured to perform mathematical and geometric calculation for graphics rendering. The processor 110 may include one or more GPUs. The one or more GPUs execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode or an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), or the like. In some embodiments, the electronic device may include one or N displays 194, where N is a positive integer greater than 1.

The electronic device may implement a shooting function by using the ISP, the camera 193, the video codec, the GPU, the display 194, the application processor, and the like.

The ISP is configured to process data fed back by the camera 193. For example, during shooting, a shutter is pressed, an optical signal is transmitted to a photosensitive element of the camera through a lens, the optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193. The photosensitive element may also be referred to as an image sensor.

The camera 193 is configured to capture a still image or a video. An optical image is generated for an object by using the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1.

The digital signal processor is configured to process a digital signal. In addition to processing a digital image signal, the digital signal processor can further process another digital signal. For example, when the electronic device processes a voice signal, the digital signal processor is configured to perform Fourier transform and the like on the voice signal.

The video codec is configured to compress or decompress a digital video. The electronic device may support one or more video codecs. In this way, the electronic device can play or record videos in a plurality of encoding formats, for example, moving picture experts group (moving picture experts group, MPEG)1, MPEG2, MPEG3, and MPEG4.

The NPU is a neural-network (neural-network, NN) computing processor that quickly processes input information by referring to a biological neural network structure, for example, by referring to a transmission mode between human brain neurons, and may further perform self-learning continuously. Applications such as intelligent cognition of the electronic device, for example, image recognition, face recognition, voice recognition, and text understanding, may be implemented by using the NPU.

The external memory interface 120 may be configured to be connected to an external memory card, for example, a Micro SD card, to expand a storage capacity of the electronic device.

The internal memory 121 may be configured to store computer-executable program code, and the executable program code includes instructions. The processor 110 runs the instructions stored in the internal memory 121, to perform various function applications and data processing of the electronic device. The internal memory 121 may include a program storage area and a data storage area.

The electronic device may implement an audio function by using the audio module 170, the speaker 170A, the receiver 170B, the microphone 170C, the headset jack 170D, the application processor, and the like. The audio function includes, for example, music playing and recording. In this embodiment, the electronic device may include n microphones 170C, where n is a positive integer greater than or equal to 2.

The audio module 170 is configured to convert digital audio information into an analog audio signal for output, and is further configured to convert an analog audio input into a digital audio signal.

The ambient light sensor 180L is configured to sense brightness of ambient light. The electronic device may adaptively adjust brightness of the display 194 based on the sensed brightness of the ambient light. The ambient light sensor 180L may be further configured to automatically adjust white balance during shooting.

The motor 191 may generate a vibration prompt. The motor 191 may be configured to provide a vibration prompt for an incoming call, and may be further configured to provide vibration feedback for a touch. For example, touch operations performed on different applications (for example, shooting and audio playing) may correspond to different vibration feedback effects.

In this embodiment of this application, the processor 110 may invoke the computer instructions stored in the internal memory 121 to enable the electronic device to perform the voice processing method in the embodiments of this application.

Figure 2:
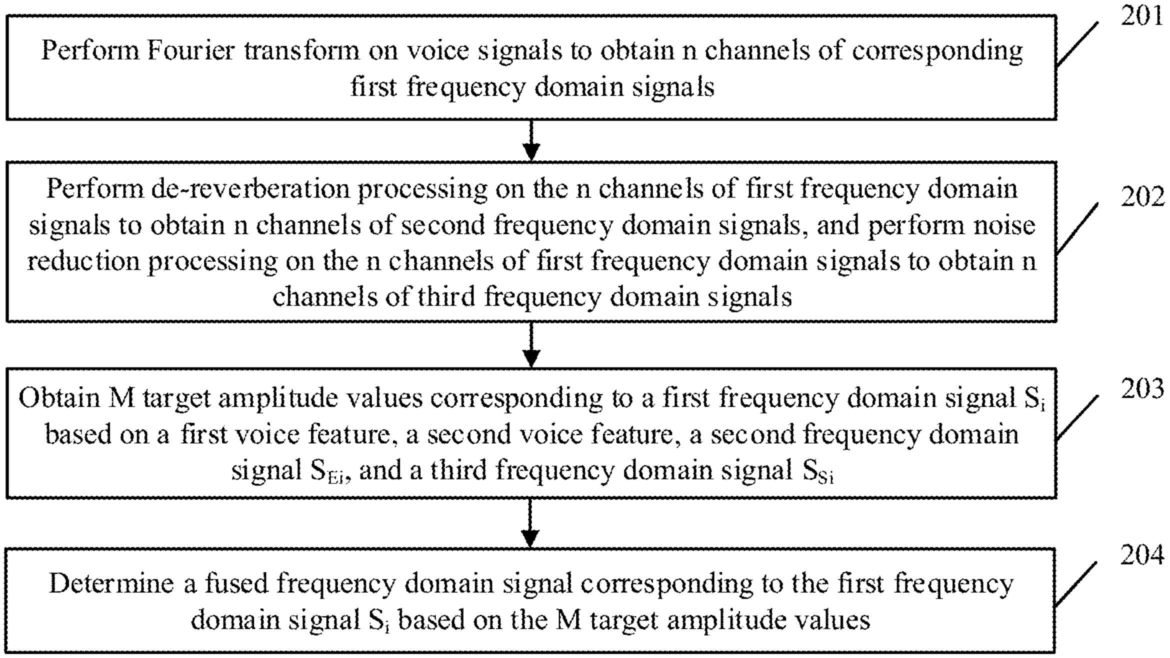
FIG. 2 is a flowchart of a voice processing method according to an embodiment of this application.
Figure 3:
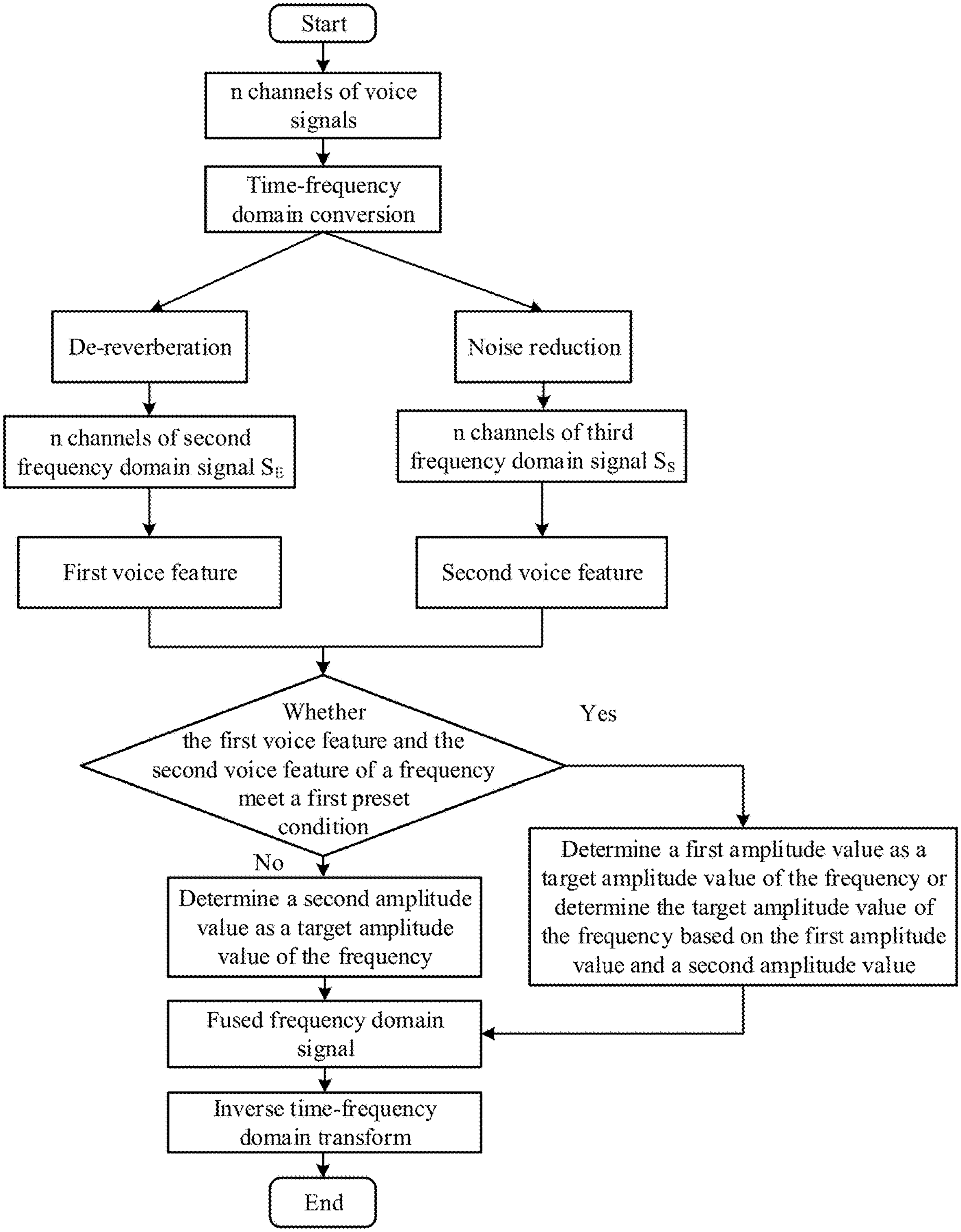
FIG. 3 is a specific flowchart of a voice processing method according to an embodiment of this application.

With reference to the foregoing schematic diagram of an example of a hardware structure of the electronic device, the following specifically describes the voice processing method in the embodiments of this application. Refer to FIG. 2 and FIG. 3. FIG. 2 is a flowchart of a voice processing method according to an embodiment of this application, and FIG. 3 is a specific flowchart of a voice processing method according to an embodiment of this application. The voice processing method includes the following steps.

201: An electronic device performs Fourier transform on voice signals picked up by n microphones to obtain n channels of corresponding first frequency domain signals S, where each channel of first frequency domain signal S has M frequencies, and M is a quantity of transform points used when the Fourier transform is performed.

Specifically, a specific function that meets a specific condition can be represented as a trigonometric function (a sine and/or cosine function) or a linear combination of integrals of the trigonometric function through Fourier transform. Time domain analysis and frequency domain analysis are two observation aspects for a signal. The time domain analysis is that a relationship between dynamic signals is represented by using a time axis as a coordinate, and the frequency domain analysis is that the signal is represented by using a frequency axis as a coordinate. Usually, time domain representation is more vivid and intuitive, while the frequency domain analysis is more concise with more profound and convenient problem analysis. Therefore, in this embodiment, for ease of processing and analysis of the voice signals, time-frequency domain conversion, namely, the Fourier transform, is performed on the voice signals picked up by the microphones, where the quantity of transform points used when the Fourier transform is performed is M, and the first frequency domain signal S obtained after the Fourier transform has M frequencies. A value of M is a positive integer, and a specific value may be set based on an actual situation. For example, M is set to $2^x$, and x is greater than or equal to 1, for example, M is 256, 1024, or 2048.

202: The electronic device performs de-reverberation processing on the n channels of first frequency domain signals S to obtain n channels of second frequency domain signals $S_E$, and performs noise reduction processing on then channels of first frequency domain signals S to obtain n channels of third frequency domain signals $S_S$.

Specifically, the de-reverberation processing is performed on the n channels of first frequency domain signals S by using a de-reverberation method, to reduce reverberation signals in the first frequency domain signals S, to obtain then channels of corresponding second frequency domain signals $S_E$, where each channel of second frequency domain signal $S_E$ has M frequencies. In addition, the noise reduction processing is performed on the n channels of first frequency domain signals S by using a noise reduction method, to reduce noise in the first frequency domain signals S, to obtain then channels of corresponding third frequency domain signals $S_S$, where each channel of third frequency domain signal $S_S$ has M frequencies.

203: The electronic device determines a first voice feature corresponding to M frequencies of a second frequency domain signal $S_{Ei}$ corresponding to a first frequency domain signal $S_i$ and a second voice feature corresponding to M frequencies of a third frequency domain signal $S_{Si}$ corresponding to the first frequency domain signal $S_i$, and obtains M target amplitude values corresponding to the first frequency domain signal $S_i$ based on the first voice feature, the second voice feature, the second frequency domain signal $S_{Ei}$, and the third frequency domain signal $S_{Si}$, where i=1, 2, . . . , or n, the first voice feature is used to represent a de-reverberation degree of the second frequency domain signal $S_{Ei}$, and the second voice feature is used to represent a noise reduction degree of the third frequency domain signal $S_{Si}$.

Specifically, the processing in step 203 is performed on both the second frequency domain signal $S_E$ and the third frequency domain signal $S_S$ that correspond to each channel of first frequency domain signal S. In this case, M target amplitude values corresponding to each of the n channels of first frequency domain signals S can be obtained, that is, n groups of target amplitude values can be obtained, where one group of target amplitude values includes M target amplitude values.

204: Determine a fused frequency domain signal corresponding to the first frequency domain signal $S_i$ based on the M target amplitude values.

Specifically, a fused frequency domain signal corresponding to one channel of first frequency domain signal S can be determined based on one group of target amplitude values, and n fused frequency domain signals corresponding to the n channels of first frequency domain signals S can be obtained. The M target amplitude values may be concatenated into one fused frequency domain signal.

By using the voice processing method in FIG. 1, the electronic device performs, based on the first voice feature of the second frequency domain signal and the second voice feature of the third frequency domain signal, fusion processing on the second frequency domain signal and the third frequency domain signal that belong to a same channel of first frequency domain signal, to obtain the fused frequency domain signal, thereby effectively ensuring stable background noise of a processed voice signal, further effectively ensuring stable background noise of a voice signal obtained after voice processing, and ensuring auditory comfort of the processed voice signal.

In a possible embodiment, with reference to FIG. 2, in step 203, the obtaining M target amplitude values corresponding to the first frequency domain signal $S_i$ based on the first voice feature, the second voice feature, the second frequency domain signal $S_{Ei}$, and the third frequency domain signal $S_S$, specifically includes:

When it is determined that the first voice feature and the second voice feature that correspond to a frequency $A_i$ in the M frequencies meet a first preset condition, it indicates that a de-reverberation effect is good. In this case, a first amplitude value corresponding to a frequency $A_i$ in the second frequency domain signal $S_{Ei}$ may be determined as a target amplitude value corresponding to the frequency $A_i$, or the target amplitude value corresponding to the frequency $A_i$ is determined based on the first amplitude value and a second amplitude value corresponding to a frequency $A_i$ in the third frequency domain signal $S_{Si}$, where i=1, 2, . . . , or M.

Alternatively, when it is determined that the first voice feature and the second voice feature that correspond to the frequency $A_i$ do not meet the first preset condition, it indicates that the de-reverberation effect is not good in this case, and the second amplitude value may be directly determined as the target amplitude value corresponding to the frequency $A_i$.

In a possible embodiment, with reference to FIG. 2, the voice processing method in this embodiment further includes:

The electronic device performs inverse Fourier transform on the fused frequency domain signal to obtain a fused voice signal.

Specifically, the electronic device may perform processing to obtain n channels of fused frequency domain signals by using the method in FIG. 1, and then the electronic device may perform inverse time-frequency domain transform, namely, the inverse Fourier transform, on the n channels of fused frequency domain signals to obtain n channels of corresponding fused voice signals. Optionally, the electronic device may further perform other processing on the n channels of fused voice signals, for example, processing such as voice recognition. In addition, optionally, the electronic device may alternatively process the n channels of fused voice signals to obtain binaural signals for output. For example, the binaural signals may be played by using a speaker.

It should be noted that the voice signal in this application may be a voice signal obtained by the electronic device through recording, or may be a voice signal included in a video obtained by the electronic device through video recording.

In a possible embodiment, before the Fourier transform is performed on the voice signals, the method further includes:

A1: The electronic device displays a shooting interface, where the shooting interface includes a first control. The first control is a control that controls a video recording process. Start and stop of video recording may be controlled by operating the first control. For example, the electronic device may be controlled to start video recording by tapping the first control, and the electronic device may be controlled to stop video recording by tapping the first control again. Alternatively, the electronic device may be controlled to start video recording by long pressing the first control, and to stop video recording by releasing the first control. Certainly, an operation of operating the first control to control start and stop of video recording is not limited to the foregoing provided examples.

A2: The electronic device detects a first operation performed on the first control. In this embodiment, the first operation is an operation of controlling the electronic device to start video recording, and may be the foregoing operation of tapping the first control or long pressing the first control.

A3: In response to the first operation, the electronic device performs image shooting to obtain a video that includes the voice signals. In response to the first operation, the electronic device performs video recording (namely, continuous image shooting) to obtain a recorded video, where the recorded video includes an image and a voice. Each time the electronic device obtains a video of a period of time through recording, the electronic device may use the voice processing method in this embodiment to process a voice signal in the video, so as to process the voice signal while performing video recording, thereby shortening a waiting time for processing the voice signal. Alternatively, the electronic device may process the voice signal in the video by using the voice processing method in this embodiment after video recording is completed.

Figure 4:
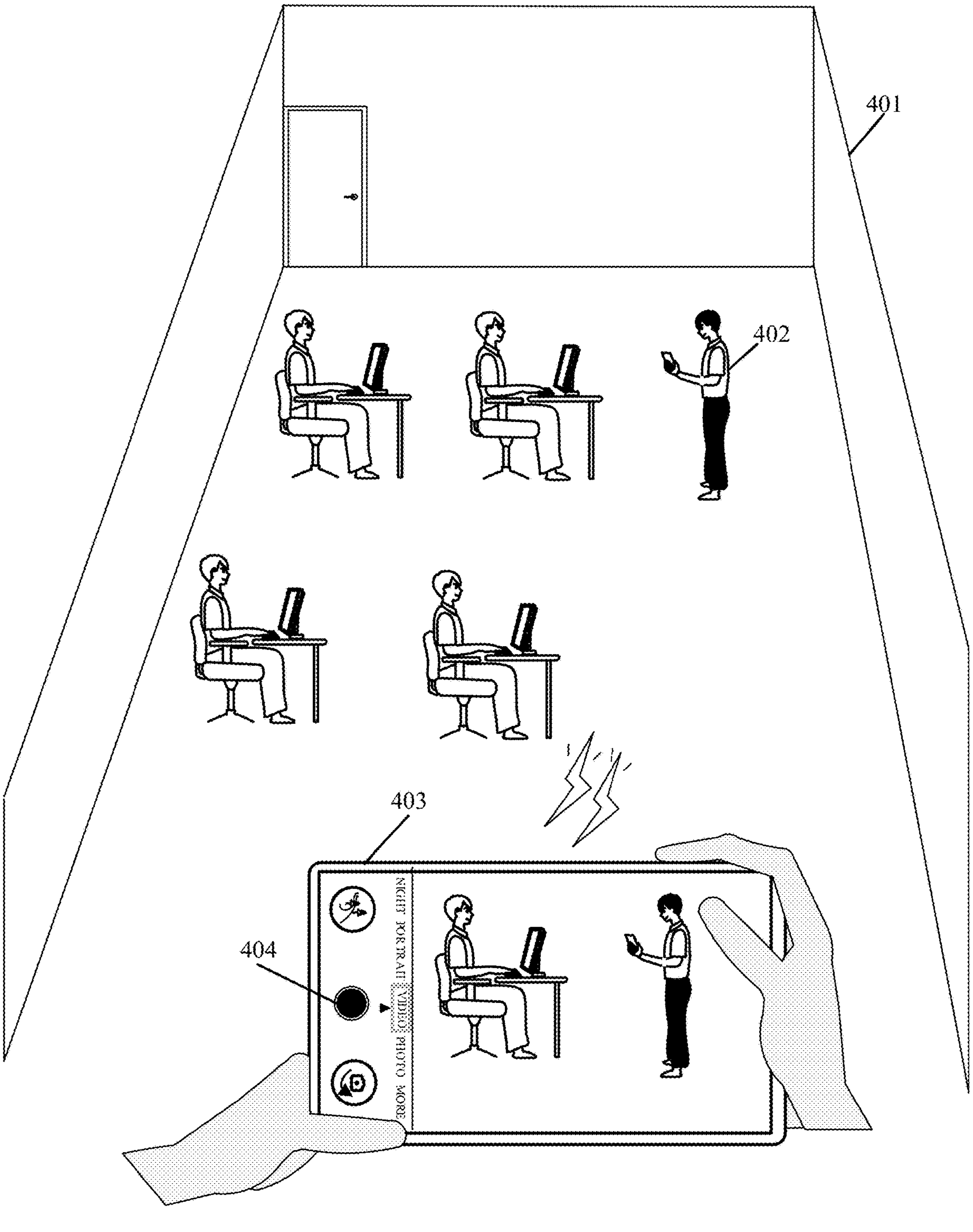
FIG. 4 is a schematic diagram of a video recording scenario according to an embodiment of this application.

FIG. 4 is a schematic diagram of a video recording scenario according to an embodiment of this application. A user may hold an electronic device 403 (for example, a mobile phone) to perform video recording in an office 401. A teacher 402 is giving a lesson to students. When a camera application in the electronic device 403 is enabled, a preview interface is displayed. The user selects a video recording function in a user interface to enter a video recording interface. A first control 404 is displayed in the video recording interface, and the user may control the electronic device 403 to start video recording by operating the first control 404. In this embodiment, in a video recording process, the electronic device can use the voice processing method in this embodiment of this application to process the voice signal in the recorded video.

In a possible embodiment, before the Fourier transform is performed on the voice signals, the method further includes:

B1: The electronic device displays a recording interface, where the recording interface includes a second control. The second control is a control that controls a recording process. Start and stop of recording may be controlled by operating the second control. For example, the electronic device may be controlled to start recording by tapping the second control, and the electronic device may be controlled to stop recording by tapping the second control again. Alternatively, the electronic device may be controlled to start recording by long pressing the second control, and to stop recording by releasing the second control. Certainly, an operation of operating the second control to control start and stop of recording is not limited to the foregoing provided examples.

B2: The electronic device detects a second operation performed on the second control. In this embodiment, the first operation is an operation of controlling the electronic device to start recording, and may be the foregoing operation of tapping the second control or long pressing the second control.

B3: In response to the second operation, the electronic device performs recording to obtain the voice signals. Each time the electronic device obtains a voice of a period of time through recording, the electronic device may use the voice processing method in this embodiment to process the voice signal, so as to process the voice signal while performing recording, thereby shortening a waiting time for processing the voice signal. Alternatively, the electronic device may process the recorded voice signal by using the voice processing method in this embodiment after recording is completed.

In a possible embodiment, the Fourier transform in step 201 may specifically include short-time Fourier transform (Short-Time Fourier Transform, STFT) or fast Fourier transform (Fast Fourier Transform, FFT). An idea of the short-time Fourier transform is as follows: A window function whose time frequency is localized is selected. It is assumed, after analysis, that a window function g(t) is stable (pseudo-stable) within a short time interval, the window function is moved, so that f(t)g(t) is a stable signal within different limited time widths, thereby calculating power spectra at different moments.

A basic idea of the fast Fourier transform is that N original sequences are sequentially decomposed into a series of short sequences. In the fast Fourier transform, symmetric property and periodic property of an exponential factor in a discrete Fourier transform (Discrete Fourier Transform, DFT) formula are fully used, to obtain DFT corresponding to these short sequences and perform appropriate combination, thereby achieving an objective of removing duplicate calculation, reducing multiplication operations, and simplifying a structure. Therefore, a processing speed of the fast Fourier transform is higher than that of the short-time Fourier transform. In this embodiment, the fast Fourier transform is preferentially selected to perform the Fourier transform on the voice signals to obtain the first frequency domain signals.

In a possible embodiment, a de-reverberation processing method in step 202 may include a de-reverberation method based on a CDR or a de-reverberation method based on a WPE.

In a possible embodiment, a noise reduction processing method in step 202 may include dual-microphone noise reduction or multi-microphone noise reduction. When the electronic device has two microphones, the noise reduction processing may be performed on first frequency domain signals corresponding to the two microphones by using a dual-microphone noise reduction technology. When the electronic device has more than three microphones, there are two noise reduction processing solutions. In a first solution, the noise reduction processing may be simultaneously performed on first frequency domain signals of the more than three microphones by using a multi-microphone noise reduction technology.

In a second solution, dual-microphone noise reduction processing may be performed on the first frequency domain signals of the more than three microphones in a combination manner. A microphone A, a microphone B, and a microphone C are used as an example. Dual-microphone noise reduction may be performed on first frequency domain signals corresponding to the microphone A and the microphone B, to obtain third frequency domain signals a1 corresponding to the microphone A and the microphone B. Then, dual-microphone noise reduction is performed on first frequency domain signals corresponding to the microphone A and the microphone C, to obtain a third frequency domain signal corresponding to the microphone C. In this case, a third frequency domain signal a2 corresponding to the microphone A may be further obtained, the third frequency domain signal a2 may be ignored, and the third frequency domain signal a1 is used as a third frequency domain signal of the microphone A. Alternatively, the third frequency domain signal a1 may be ignored, and the third frequency domain signal a2 is used as a third frequency domain signal of the microphone A. Alternatively, different weights may be assigned to a1 and a2, and then a weighted operation is performed based on the third frequency domain signal a1 and the third frequency domain signal a2 to obtain a final third frequency domain signal of the microphone A.

Optionally, the dual-microphone noise reduction processing may alternatively be performed on the first frequency domain signals corresponding to the microphone B and the microphone C, to obtain the third frequency domain signal corresponding to the microphone C. For a method for determining the third frequency domain signal of the microphone B, refer to the method for determining the third frequency domain signal of the microphone A. Details are not described again. In this way, the noise reduction processing may be performed on the first frequency domain signals corresponding to the three microphones by using the dual-microphone noise reduction technology, to obtain the third frequency domain signals corresponding to the three microphones.

The dual-microphone noise reduction technology is a most common noise reduction technology that is applied in a large scale. One microphone is a common microphone used by a user during a call, and is used for voice collection. The other microphone configured at a top end of a body of the electronic device has a background noise collection function, which facilitates collection of surrounding ambient noise. A mobile phone is used as an example. It is assumed that two capacitive microphones A and B with same performance are disposed on the mobile phone. A is a primary microphone and is configured to pick up a voice of a call, and the microphone B is a background sound pickup microphone and is usually mounted on a back side of a mobile phone microphone, and is far away from the microphone A. The two microphones are internally isolated by a main board. During a normal voice call, when a mouth is close to the microphone A, the mouth generates a large audio signal Va. At the same time, the microphone B also obtains a voice signal Vb. However, it is much smaller than A. The two signals are input into processors of the microphones, and an input end of the processor is a differential amplifier. That is, subtraction is performed on the two channels of signals, and an obtained signal is amplified to obtain a signal Vm=Va−Vb. If there is background noise in a use environment, because a sound source is far away from the mobile phone, intensities of sound waves reaching the two microphones of the mobile phone are almost the same, that is, Va≈Vb. In this case, although the two microphones pick up the background noise, Vm=Va−Vb≈0. It can be learned from the foregoing analysis that this design can effectively resist ambient noise interference around the mobile phone, thereby greatly improving clarity of a normal call, and implementing noise reduction.

Further, the dual-microphone noise reduction solution may include a double Kalman filter solution or another noise reduction solution. A main idea of a Kalman filter solution is as follows: Frequency domain signals S1 of a primary microphone and frequency domain signals S2 of a secondary microphone are analyzed. For example, the frequency domain signals S1 of the secondary microphone are used as reference signals, and noise signals in the frequency domain signals S2 of the primary microphone are filtered out by using a Kalman filter through continuous iteration and optimization, to obtain clean voice signals.

In a possible embodiment, the first voice feature includes a first dual-microphone correlation coefficient and first frequency energy, and/or the second voice feature includes a second dual-microphone correlation coefficient and second frequency energy.

The first dual-microphone correlation coefficient is used to represent a signal correlation degree between the second frequency domain signal $S_{Ei}$ and a second frequency domain signal $S_{Et}$ at corresponding frequencies, and the second frequency domain signal $S_{Et}$ is any channel of second frequency domain signal $S_E$ other than the second frequency domain signal $S_{Ei}$ in the n channels of second frequency domain signals $S_E$; and the second dual-microphone correlation coefficient is used to represent a signal correlation degree between the third frequency domain signal $S_S$, and a third frequency domain signal $S_{St}$ at corresponding frequencies, and the third frequency domain signal $S_{St}$ is a third frequency domain signal $S_S$ that is in the n channels of third frequency domain signals $S_S$ and that corresponds to a same first frequency domain signal as the second frequency domain signal $S_{Et}$. In addition, first frequency energy of a frequency is a squared value of an amplitude of a frequency on the second frequency domain signal, and second frequency energy of a frequency is a squared value of an amplitude of a frequency on the third frequency domain signal. Because the second frequency domain signal and the third frequency domain signal each have M frequencies, M first dual-microphone correlation coefficients and M pieces of first frequency energy may be obtained for each channel of second frequency domain signal, and M second dual-microphone correlation coefficients and M pieces of second frequency energy may be obtained for each channel of third frequency domain signal.

Further, a second frequency domain signal that is in second frequency domain signals other than the second frequency domain signal $S_E$, in the n channels of second frequency domain signals $S_E$ and whose microphone location is closest to a microphone of the second frequency domain signal $S_{Ei}$ may be used as the second frequency domain signal $S_{Et}$.

In particular, a correlation coefficient is an amount used to study a linear correlation degree between variables, and is usually represented by a letter γ. In this embodiment of this application, the first dual-microphone correlation coefficient and the second dual-microphone correlation coefficient each represent similarity between frequency domain signals corresponding to each of the two microphones. If the dual-microphone correlation coefficients of the frequency domain signals of the two microphones are larger, it indicates that signal cross-correlation between the two microphones is larger, and voice components of the two microphones are higher.

Further, a formula for calculating the first dual-microphone correlation coefficient is as follows:

$$\gamma_{12}(t,f)=\frac{\Phi_{12}(t,f)}{\sqrt{\Phi_{11}(t,f)\Phi_{22}(t,f)}}$$

In the formula, $\gamma_{12}$(t,f) represents correlation between the second frequency domain signal $S_{Ei}$ and the second frequency domain signal $S_{Et}$ at corresponding frequencies, $\Phi_{12}$(t,f) represents a cross-power spectrum between the second frequency domain signal $S_{Ei}$ and the second frequency domain signal $S_{Et}$ at the frequencies, $\Phi_{11}$(t,f) represents an auto-power spectrum of the second frequency domain signal $S_{Ei}$ at the frequency, and $\Phi_{22}$ (t,f) represents an auto-power spectrum of the second frequency domain signal $S_{Et}$ at the frequency.

Formulas for resolving $\Phi_{12}$ (t,f), $\Phi_{11}$(t,f) and $\Phi_{22}$ (t,f) are respectively as follows:

$$\Phi_{12}(t,f)=E\{X_1\{t,f\}X^*_2\{t,f\}\}$$

$$\Phi_{11}(t,f)=E\{X_1\{t,f\}X^*_1\{t,f\}\}$$

$$\Phi_{22}(t,f)=E\{X_2\{t,f\}X^*_2\{t,f\}\}$$

In the foregoing three formulas, E{ } is an expectation, $X_1$\{t, f\}=A(t,f)*cos(w)+j*A(t,f)*sin (w), $X_1$\{t, f\} represents a complex field of the frequency in the second frequency domain signal $S_{Ei}$ and represents an amplitude and phase information of a frequency domain signal corresponding to the frequency, and A(t,f) represents energy of sound corresponding to the frequency in the second frequency domain signal $S_{Ei}$. $X_2$\{t, f\}=A'(t,f)*cos(w)+j*A'(t,f)*sin (w), $X_2$\{t, f\} represents a complex field of the frequency in the second frequency domain signal $S_{Et}$ and represents an amplitude and phase information of a frequency domain signal corresponding to the frequency, and A'(t,f) represents energy of sound corresponding to the frequency in the second frequency domain signal $S_{Et}$.

In addition, a formula for calculating the second dual-microphone correlation coefficient is similar to that for calculating the first dual-microphone correlation coefficient. Details are not described again.

In a possible embodiment, the first preset condition is that the first dual-microphone correlation coefficient and the second dual-microphone correlation coefficient of the frequency $A_i$ meet a second preset condition, and the first frequency energy and the second frequency energy of the frequency $A_i$ meet a third preset condition.

When the frequency $A_i$ meets both the second preset condition and the third preset condition, it is considered that a de-reverberation effect is good, it indicates that more unwanted signals are removed from the second frequency domain signals, and a proportion of voice components in remaining second frequency domain signals is large. In this case, a first amplitude value corresponding to a frequency $A_i$ in the second frequency domain signal $S_{Ei}$ is selected as a target amplitude value corresponding to the frequency $A_i$. Alternatively, smooth fusion is performed on the first amplitude value corresponding to the frequency $A_i$ in the second frequency domain signal $S_{Ei}$ and a second amplitude value corresponding to a frequency $A_i$ in the third frequency domain signal $S_{Si}$, to obtain the target amplitude value corresponding to the frequency $A_i$. Therefore, an advantage of noise reduction is used to remove adverse impact of de-reverberation on stable noise, thereby ensuring that background noise in a fused frequency domain signal is not damaged, and ensuring auditory comfort of a processed voice signal. Further, the smooth fusion specifically includes:

obtaining a first weighted amplitude value based on the first amplitude value of the corresponding frequency $A_i$ in the second frequency domain signal $S_{Ei}$ and a corresponding first weight $q_1$, obtaining a second weighted value based on the second amplitude value of the corresponding frequency $A_i$ in the third frequency domain signal $S_S$, and a corresponding second weight $q_2$, and determining a sum of the first weighted amplitude value and the second weighted amplitude value as the target amplitude value corresponding to the frequency $A_i$, where the target amplitude value corresponding to the frequency $A_i$ is $S_{Ri}=q_1*S_{Ei}+q_2*S_{Si}$. A sum of the first weight $q_1$ and the second weight $q_2$ is 1, and specific values of the first weight $q_1$ and the second weight $q_2$ may be set based on an actual situation. For example, the first weight $q_1$ is 0.5, and the second weight $q_2$ is 0.5; the first weight $q_1$ is 0.6, and the second weight $q_2$ is 0.3; or the first weight is 0.7, and the second weight $q_2$ is 0.3.

When the frequency $A_i$ does not meet the second preset condition, the frequency $A_i$ does not meet the third preset condition, or the frequency $A_i$ does not meet the second preset condition and the third preset condition, it indicates that the de-reverberation effect is not good. In this case, the second amplitude value corresponding to the frequency $A_i$ in the third frequency domain signal $S_S$, is determined as the target amplitude value corresponding to the frequency $A_i$. This avoids an adverse effect caused by de-reverberation, and ensures comfort of background noise of a processed voice signal.

In a possible embodiment, the second preset condition is that a first difference of the first dual-microphone correlation coefficient of the frequency $A_i$ minus the second dual-microphone correlation coefficient of the frequency $A_i$ is greater than a first threshold.

A specific value of the first threshold may be set based on an actual situation, and is not particularly limited. When the frequency $A_i$ meets the second preset condition, it can be considered that the de-reverberation effect is obvious, and a voice component is greater than a noise reduction component to a specific extent after de-reverberation.

In a possible embodiment, the third preset condition is that a second difference of the first frequency energy of the frequency $A_i$ minus the second frequency energy of the frequency $A_i$ is less than a second threshold.

A specific value of the second threshold may be set based on an actual situation, and is not particularly limited. The second threshold is a negative value. When the frequency $A_i$ meets the third preset condition, it is considered that energy obtained after de-reverberation is less than energy obtained after noise reduction to a specific extent, and it is considered that more unwanted signals are removed from the second frequency domain signals after de-reverberation.

The following describes examples of two use scenarios of the voice processing method in the embodiments of this application.

Figure 5A:
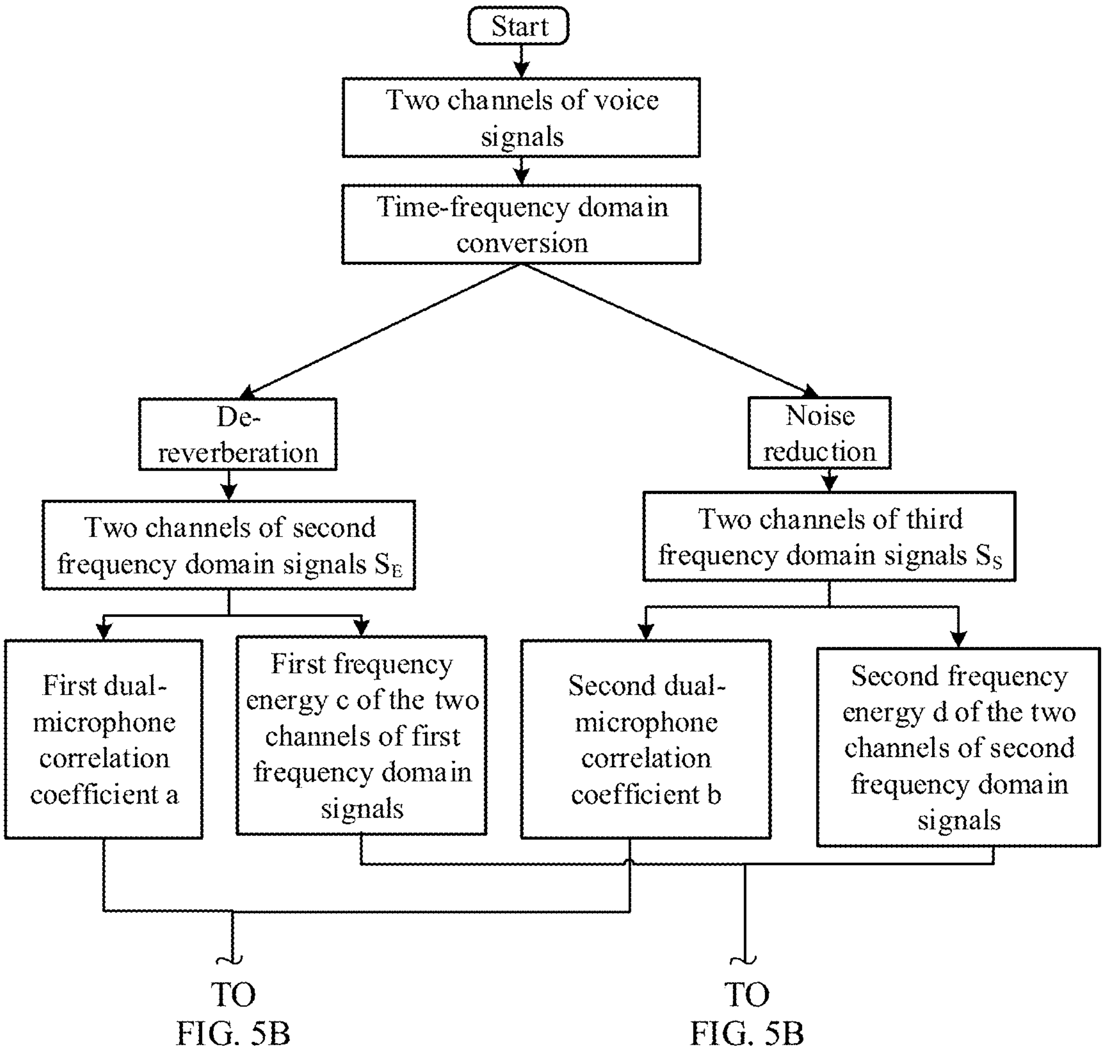
FIG. 5A and FIG. 5B are a schematic flowchart of an example of a voice processing method according to an embodiment of this application.
Figure 5B:
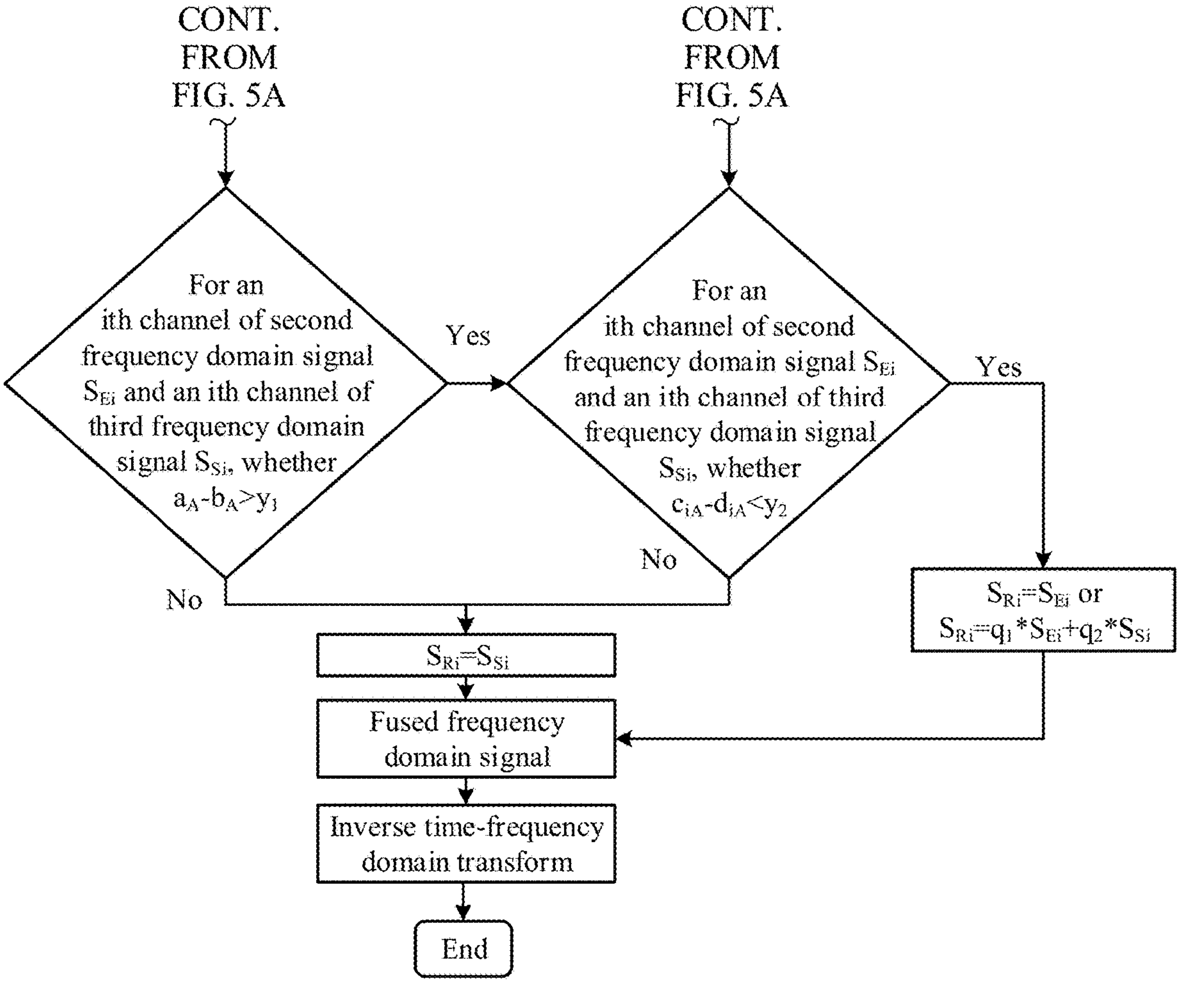

Use Scenario 1:

FIG. 5A and FIG. 5B are a schematic flowchart of an example of a voice processing method according to an embodiment of this application.

In this embodiment, an electronic device has two microphones disposed at a top part of the electronic device and a bottom part of the electronic device. Correspondingly, the electronic device can obtain two channels of voice signals. Refer to FIG. 4. Obtaining of a voice signal through video recording is used as an example. The camera application in the electronic device is enabled, and the preview interface is displayed. The user selects the video recording function in the user interface to enter the video recording interface. The first control 404 is displayed in the video recording interface, and the user may control the electronic device 403 to start video recording by operating the first control 404. An example in which voice processing is performed on a voice signal in a video in a video recording process is used for description.

The electronic device performs time-frequency domain conversion on the two channels of voice signals to obtain two channels of first frequency domain signals, and then separately performs de-reverberation processing and noise reduction processing on the two channels of first frequency domain signals to obtain two channels of second frequency domain signals $S_{E1}$ and $S_{E2}$ and two channels of corresponding third frequency domain signals $S_{S1}$ and $S_{S2}$.

The electronic device calculates a first dual-microphone correlation coefficient a between the second frequency domain signal $S_{Ei}$ and the second frequency domain signal $S_{E2}$, and first frequency energy $c_1$ of the second frequency domain signal $S_{Ei}$ and first frequency energy $c_2$ of the second frequency domain signal $S_{E2}$.

The electronic device calculates a second dual-microphone correlation coefficient b between the third frequency domain signal $S_{Si}$ and the third frequency domain signal $S_{S2}$, and second frequency energy $d_1$ of the third frequency domain signal $S_{Si}$ and second frequency energy $d_2$ of the third frequency domain signal $S_{S2}$.

Then, the electronic device determines whether a second frequency domain signal $S_{Ei}$ and a third frequency domain signal $S_{Si}$ that correspond to an ith channel of first frequency domain signal meet a fusion condition. The following uses an example in which the electronic device determines whether the second frequency domain signal $S_{Ei}$ and the third frequency domain signal $S_{Si}$ that correspond to a first channel of first frequency domain signal meet the fusion condition for description. Specifically, the following determining processing is performed on each frequency A on the second frequency domain signal $S_{Ei}$:

determining whether a first difference of as corresponding to the frequency A minus $b_A$ corresponding to the frequency A is greater than a first threshold y1;

determining whether a second difference of $c_{1A}$ corresponding to the frequency A minus $d_{1A}$ corresponding to the frequency A is less than a second threshold y2; and when the frequency A meets the foregoing two determining conditions, using a first amplitude value corresponding to the frequency A in the second frequency domain signal $S_{Ei}$ as a target amplitude value of the frequency $A_i$ that is, $S_{R1}=S_{Ei}$; or performing a weighted operation based on the first amplitude value, a corresponding first weight $q_1$, a second amplitude value corresponding to the frequency A in the third frequency domain signal $S_{Si}$, and a corresponding second weight $q_2$, to obtain the target amplitude value of the frequency $A_i$ that is, $SR_1=q_1*S_{Ei}+q_2*S_{Si}$. Otherwise, when the frequency A does not meet at least one of the foregoing determining conditions, the second amplitude value corresponding to the frequency A is used as the target amplitude value of the frequency $A_i$ that is, $S_{R1}=S_{Si}$.

After the foregoing processing, it is assumed that the second frequency domain signal and the third frequency domain signal each have M frequencies, and then corresponding M target amplitude values may be obtained. The electronic device may fuse the second frequency domain signal $S_{E1}$ and the third frequency domain signal $S_{S1}$ based on the M target amplitude values to obtain a first channel of fused frequency domain signal.

The electronic device may determine, by using the method for determining the second frequency domain signal $S_{E1}$ and the third frequency domain signal $S_{S1}$ that correspond to the first channel of frequency domain signal, the second frequency domain signal $S_{E2}$ and the third frequency domain signal $S_{S2}$ that correspond to a second channel of frequency domain signal. Details are not described. Therefore, the electronic device may fuse the second frequency domain signal $S_{E2}$ and the third frequency domain signal $S_{S2}$ to obtain a second channel of fused frequency domain signal.

Then, the electronic device performs inverse time-frequency domain transform on the first channel of fused frequency domain signal and the second channel of fused frequency domain signal to obtain a first channel of fused voice signal and a second channel of fused voice signal.

Use Scenario 2:

In this embodiment, an electronic device has three microphones disposed on a top part of the electronic device, a bottom part of the electronic device, and a back part of the electronic device. Correspondingly, the electronic device can obtain three channels of voice signals. Refer to FIG. 5A and FIG. 5B. Similarly, the electronic device performs time-frequency domain conversion on the three channels of voice signals to obtain three channels of first frequency domain signals, and the electronic device performs de-reverberation processing on the three channels of first frequency domain signals to obtain three channels of second frequency domain signals, and performs noise reduction processing on the three channels of first frequency domain signals to obtain three channels of third frequency domain signals.

Then, when a first dual-microphone correlation coefficient and a second dual-microphone correlation coefficient are calculated, for one channel of first frequency domain signal, another channel of first frequency domain signal may be randomly selected to calculate the first dual-microphone correlation coefficient, or one channel of first frequency domain signal whose microphone location is close may be selected to calculate the first dual-microphone correlation coefficient. Similarly, the electronic device needs to calculate first frequency energy of each channel of second frequency domain signal and second frequency energy of each channel of third frequency domain signal. Then, the electronic device may fuse the second frequency domain signal and the third frequency domain signal by using a determining method similar to that in the use scenario 1, to obtain a fused frequency domain signal, and finally convert the fused frequency domain signal into a fused voice signal to complete a voice processing process.

It should be understood that, in addition to the foregoing use scenarios, the voice processing method in the embodiments of this application may be further applied to another scenario, and the embodiments of this application are not limited to the foregoing use scenarios.

In the embodiments of this application, with reference to FIG. 1 and FIG. 2, related instructions of the voice processing method in the embodiments of this application may be prestored in the internal memory 121 or a storage device externally connected to the external memory interface 120 in the electronic device, to enable the electronic device to perform the voice processing method in the embodiments of this application.

The following uses step 201-step 203 as an example to describe a workflow of the electronic device.

1: The electronic device obtains a voice signal picked up by a microphone.

In some embodiments, the touch sensor 180K of the electronic device receives a touch operation (triggered when a user touches a first control or a second control), and corresponding hardware interruption is sent to the kernel layer. The kernel layer processes the touch operation into an original input event (including information such as a touch coordinate and a timestamp of the touch operation). The original input event is stored at the kernel layer. The application framework layer obtains the original input event from the kernel layer, and identifies a control corresponding to the input event.

For example, the touch operation is a single-tap touch operation, and a control corresponding to the single-tap operation is, for example, the first control in the camera application. The camera application invokes an interface of the application framework layer, and the camera application is enabled, to enable the camera driver by invoking the kernel layer, and obtain a to-be-processed image by using the camera 193.

Specifically, the camera 193 of the electronic device may transmit, to the image sensor of the camera 193 through a lens, an optical signal reflected by a photographed object. The image sensor converts the optical signal into an electrical signal, the image sensor transmits the electrical signal to the ISP, and the ISP converts the electrical signal into a corresponding image, to obtain a shot video. During video shooting, the microphone 170C of the electronic device picks up surrounding sound to obtain a voice signal, and the electronic device may store the shot video and the correspondingly collected voice signal in the internal memory 121 or the storage device externally connected to the external memory interface 120. The electronic device has n microphones, and may obtain n channels of voice signals.

2: The electronic device converts then channels of voice signals into n channels of first frequency domain signals.

The electronic device may obtain, by using the processor 110, the voice signal stored in the internal memory 121 or the storage device externally connected to the external memory interface 120. The processor 110 of the electronic device invokes related computer instructions to perform time-frequency domain conversion on the voice signal to obtain a corresponding first frequency domain signal.

3: The electronic device performs de-reverberation processing on then channels of first frequency domain signals to obtain n channels of second frequency domain signals, and performs noise reduction processing on the n channels of first frequency domain signals to obtain n channels of third frequency domain signals.

The processor 110 of the electronic device invokes related computer instructions, to separately perform the de-reverberation processing and the noise reduction processing on the first frequency domain signals, to obtain the n channels of second frequency domain signals and the n channels of third frequency domain signals.

4: The electronic device determines a first voice feature of each channel of second frequency domain signal and a second voice feature of each channel of third frequency domain signal.

The processor 110 of the electronic device invokes related computer instructions to calculate the first voice feature of the second frequency domain signal and calculate the second voice feature of the third frequency domain signal.

5: The electronic device performs fusion processing on the second frequency domain signal and the third frequency domain signal that correspond to a same channel of first frequency domain signal, to obtain a fused frequency domain signal.

The processor 110 of the electronic device invokes related computer instructions to obtain a first threshold and a second threshold from the internal memory 121 or the storage device externally connected to the external memory interface 120. The processor 110 determines a target amplitude value corresponding to a frequency based on the first threshold, the second threshold, the first voice feature of the second frequency domain signal corresponding to a frequency, and the second voice feature of the third frequency domain signal corresponding to a frequency, performs the foregoing fusion processing on M frequencies to obtain M target amplitude values, and may obtain a corresponding fused frequency domain signal based on the M target amplitude values.

One channel of fused frequency domain signal may be obtained corresponding to one channel of first frequency domain signal. Therefore, the electronic device can obtain n channels of fused frequency domain signals.

6: The electronic device performs inverse time-frequency domain conversion based on the n channels of fused frequency domain signals to obtain n channels of fused voice signals.

The processor 110 of the electronic device may invoke related computer instructions to perform inverse time-frequency domain conversion processing on the n channels of fused frequency domain signals, to obtain the n channels of fused voice signals.

In conclusion, by using the voice processing method provided in this embodiment of this application, the electronic device first performs the de-reverberation processing on the first frequency domain signal to obtain the second frequency domain signal, performs the noise reduction processing on the first frequency domain signal to obtain the third frequency domain signal, and then performs, based on the first voice feature of the second frequency domain signal and the second voice feature of the third frequency domain signal, fusion processing on the second frequency domain signal and the third frequency domain signal that belong to a same channel of first frequency domain signal, to obtain the fused frequency domain signal. Because both a de-reverberation effect and stable background noise are considered, de-reverberation can be implemented, and stable background noise of a voice signal obtained after voice processing can be effectively ensured.

Figure 6A:
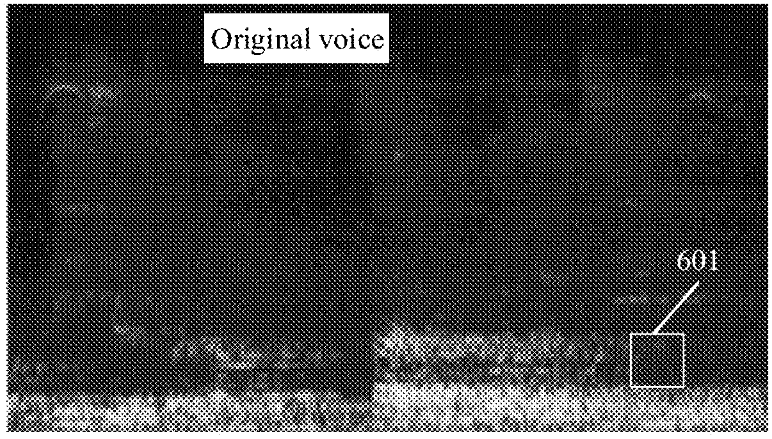
FIG. 6A, FIG. 6B, and FIG. 6C are schematic diagrams of comparison of effects of voice processing methods according to an embodiment of this application.
Figure 6B:
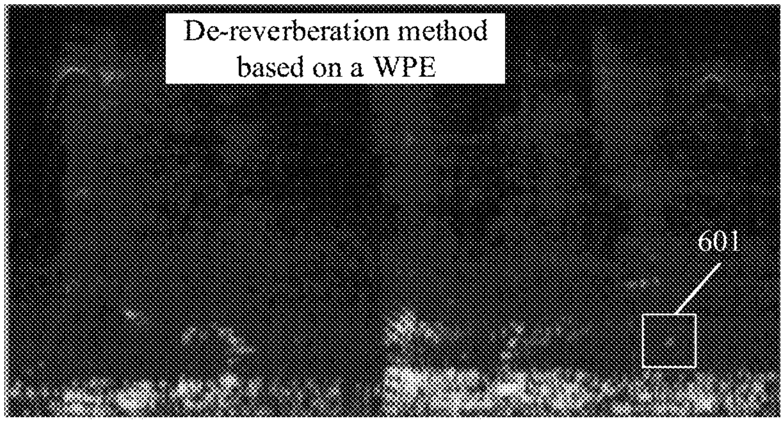
Figure 6C:
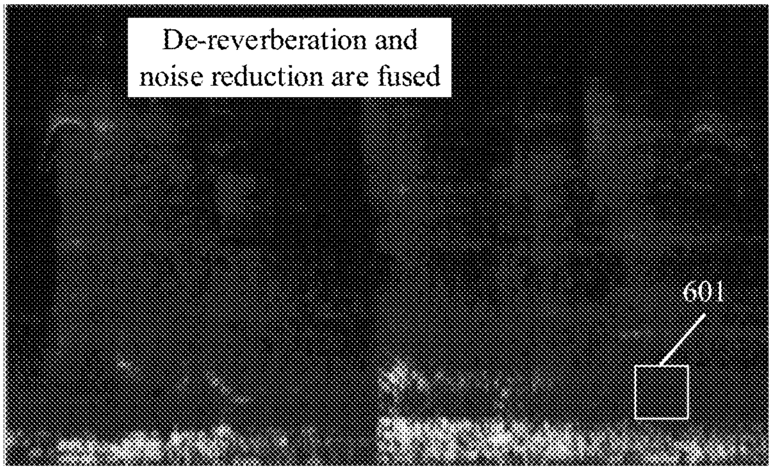

The following describes an effect of the voice processing method in the embodiments of this application. FIG. 6A, FIG. 6B, and FIG. 6C are schematic diagrams of comparison of effects of voice processing methods according to an embodiment of this application. FIG. 6A is a spectrogram of an original voice, FIG. 6B is a spectrogram obtained after the original voice is processed by using a WPE-based de-reverberation method, and FIG. 6C is a spectrogram obtained after the original voice is processed by using a voice processing method in which de-reverberation and noise reduction are fused according to an embodiment of this application. A horizontal coordinate of the spectrogram is a time, and a vertical coordinate is a frequency. A color of a specific place in the figure represents energy of a specific frequency at a specific moment. A brighter color represents larger energy of a frequency band at the moment.

In FIG. 6A, there is a tailing phenomenon in an abscissa direction (a time axis) in the spectrogram of the original voice, and it indicates that recording is followed by reverberation. This obvious tailing does not exist in FIG. 6B and FIG. 6C, and it represents that reverberation is eliminated.

In addition, in FIG. 6B, a difference between a bright part and a dark part of a spectrogram of a low-frequency part (a part with a small value in an ordinate direction) in an abscissa direction (a time axis) is large within a specific period of time, that is, graininess is strong, and it indicates that an energy change of the low-frequency part is abrupt on the time axis after WPE de-reverberation is performed on the spectrogram of the low-frequency part. Consequently, a part that is of the original voice and that has stable background noise sounds unstable due to a fast energy change—sounds like artificially generated noise. In FIG. 6C, this problem is greatly optimized by using the voice processing method in which de-reverberation and noise reduction are fused, the graininess is improved, and comfort of a processed voice is enhanced. An area in a frame 601 is used as an example. Reverberation exists in the original voice, and reverberation energy is large. Graininess of the area of the frame 601 is strong after WPE de-reverberation is performed on the original voice. The graininess of the area of the frame 601 is obviously improved after the original voice is processed by using the voice processing method in this application.

As described above, the foregoing embodiments are merely intended to describe the technical solutions of this application, but not intended to limit this application. Although this application is described in detail with reference to the foregoing embodiments, persons of ordinary skill in the art should understand that they can still make modifications to the technical solutions described in the foregoing embodiments or make equivalent replacements to some technical features thereof, without departing from the scope of the technical solutions of the embodiments of this application.

As used in the foregoing embodiments, based on the context, the term "when . . . " may be interpreted as a meaning of "if . . . ", "after . . . ", "in response to determining . . . ", or "in response to detecting . . . ". Similarly, based on the context, the phrase "when determining" or "if detecting (a stated condition or event)" may be interpreted as a meaning of "if determining . . . ", "in response to determining . . . ", "when detecting (a stated condition or event)", or "in response to detecting . . . (a stated condition or event)".

The foregoing embodiments may be completely or partially implemented by using software, hardware, firmware, or any combination thereof. When being implemented by the software, the embodiments may be completely or partially implemented in a form of a computer program product. The computer program product includes one or more computer instructions. When the computer program instructions are loaded and executed on a computer, all or some of procedures or functions according to the embodiments of this application are produced. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired manner (for example, a coaxial cable, an optical fiber, or a digital subscriber line) or a wireless manner (for example, infrared, wireless, or microwave). The computer-readable storage medium may be any available medium accessible by a computer, or a data storage device integrating one or more available media, for example, a server or a data center. The available medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the procedures of the method in the embodiments are implemented. The procedures may be completed by a computer program instructing related hardware. The program may be stored in a computer-readable storage medium. When the program is executed, the procedures in the foregoing method embodiments may be included. The foregoing storage medium includes any medium that can store program code, for example, a ROM, a random access memory RAM, a magnetic disk, or an optical disc.

What is claimed is:

1. A voice processing method, applied to an electronic device, wherein the electronic device comprises n microphones, n is greater than or equal to 2, and the method comprises:

performing Fourier transform on voice signals picked up by the n microphones to obtain n channels of corresponding first frequency domain signals S, wherein each channel of first frequency domain signal S has M frequencies, and M is a quantity of transform points used when the Fourier transform is performed;

performing de-reverberation processing on the n channels of first frequency domain signals S to obtain n channels of second frequency domain signals $S_E$, and performing noise reduction processing on the n channels of first frequency domain signals S to obtain n channels of third frequency domain signals $S_s$;

determining a first voice feature corresponding to M frequencies of a second frequency domain signal $S_{Ei}$ corresponding to a first frequency domain signal $S_i$ and a second voice feature corresponding to M frequencies of a third frequency domain signal $S_{Si}$ corresponding to the first frequency domain signal $S_i$, and obtaining M target amplitude values corresponding to the first frequency domain signal $S_i$ based on the first voice feature, the second voice feature, the second frequency domain signal $S_{Ei}$, and the third frequency domain signal $S_{Si}$, wherein i=1, 2, . . . , or n, the first voice feature is used to represent a de-reverberation degree of the second frequency domain signal $S_{Ei}$, and the second voice feature is used to represent a noise reduction degree of the third frequency domain signal $S_{Si}$; and determining a fused frequency domain signal corresponding to the first frequency domain signal $S_i$ based on the M target amplitude values.

2. The method according to claim 1, wherein the obtaining M target amplitude values corresponding to the first frequency domain signal $S_i$ based on the first voice feature, the second voice feature, the second frequency domain signal $S_{Ei}$, and the third frequency domain signal $S_{Si}$ specifically comprises:

when it is determined that the first voice feature and the second voice feature that correspond to a frequency $A_i$ in the M frequencies meet a first preset condition, determining a first amplitude value corresponding to a frequency $A_i$ in the second frequency domain signal $S_{Ei}$ as a target amplitude value corresponding to the frequency $A_i$, or determining the target amplitude value corresponding to the frequency $A_i$ based on the first amplitude value and a second amplitude value corresponding to a frequency $A_i$ in the third frequency domain signal $S_{Si}$, wherein i=1, 2, . . . , or M; or when it is determined that the first voice feature and the second voice feature that correspond to the frequency $A_i$ do not meet the first preset condition, determining the second amplitude value as the target amplitude value corresponding to the frequency $A_i$.

3. The method according to claim 2, wherein the determining the target amplitude value corresponding to the frequency $A_i$ based on the first amplitude value and a second amplitude value corresponding to a frequency $A_i$ in the third frequency domain signal $S_{Si}$ specifically comprises:

determining a first weighted amplitude value based on the first amplitude value corresponding to the frequency $A_i$ and a corresponding first weight, and determining a second weighted amplitude value based on the second amplitude value corresponding to the frequency $A_i$ and a corresponding second weight; and determining a sum of the first weighted amplitude value and the second weighted amplitude value as the target amplitude value corresponding to the frequency $A_i$.

4. The method according to claim 2, wherein the first voice feature comprises a first dual-microphone correlation coefficient and a first frequency energy value, and the second voice feature comprises a second dual-microphone correlation coefficient and a second frequency energy value; and the first dual-microphone correlation coefficient is used to represent a signal correlation degree between the second frequency domain signal $S_{Ei}$ and a second frequency domain signal $S_{Et}$ at corresponding frequencies, the second frequency domain signal $S_{Et}$ is any channel of second frequency domain signal $S_E$ other than the second frequency domain signal $S_{Ei}$ in the n channels of second frequency domain signals $S_E$, the second dual-microphone correlation coefficient is used to represent a signal correlation degree between the third frequency domain signal $S_{Si}$ and a third frequency domain signal $S_{St}$ at corresponding frequencies, and the third frequency domain signal $S_{St}$ is a third frequency domain signal $S_s$ that is in the n channels of third frequency domain signals $S_s$ and that corresponds to a same first frequency domain signal as the second frequency domain signal $S_{Et}$.

5. The method according to claim 4, wherein the first preset condition is that the first dual-microphone correlation coefficient and the second dual-microphone correlation coefficient of the frequency $A_i$ meet a second preset condition, and the first frequency energy value and the second frequency energy value of the frequency $A_i$ meet a third preset condition.

6. The method according to claim 5, wherein the second preset condition is that a first difference of the first dual-microphone correlation coefficient of the frequency $A_i$ minus the second dual-microphone correlation coefficient of the frequency $A_i$ is greater than a first threshold; and the third preset condition is that a second difference of the first frequency energy value of the frequency $A_i$ minus the second frequency energy value of the frequency $A_i$ is less than a second threshold.

7. The method according to claim 1, wherein a de-reverberation processing method comprises a de-reverberation method based on a coherent-to-diffuse power ratio or a de-reverberation method based on a weighted prediction error.

8. The method according to claim 1, wherein the method further comprises:

performing inverse Fourier transform on the fused frequency domain signal to obtain a fused voice signal.

9. The method according to claim 1, wherein before the Fourier transform is performed on the voice signals, the method further comprises:

displaying a shooting interface, wherein the shooting interface comprises a first control;

detecting a first operation performed on the first control; and in response to the first operation, performing, by the electronic device, video shooting to obtain a video that comprises the voice signals.

10. An electronic device, wherein the electronic device comprises:

n microphones, n is greater than or equal to 2;

one or more processors and one or more memories; and the one or more memories are coupled to the one or more processors, the one or more memories are configured to store computer program code, the computer program code comprises computer instructions, and when the one or more processors execute the computer instructions, the electronic device is enabled to perform the following steps:

performing Fourier transform on voice signals picked up by the n microphones to obtain n channels of corresponding first frequency domain signals S, wherein each channel of first frequency domain signal S has M frequencies, and M is a quantity of transform points used when the Fourier transform is performed;

performing de-reverberation processing on the n channels of first frequency domain signals S to obtain n channels of second frequency domain signals $S_E$, and performing noise reduction processing on the n channels of first frequency domain signals S to obtain n channels of third frequency domain signals $S_s$;

determining a first voice feature corresponding to M frequencies of a second frequency domain signal $S_{Ei}$ corresponding to a first frequency domain signal $S_i$ and a second voice feature corresponding to M frequencies of a third frequency domain signal $S_{Si}$ corresponding to the first frequency domain signal $S_i$, and obtaining M target amplitude values corresponding to the first frequency domain signal $S_i$ based on the first voice feature, the second voice feature, the second frequency domain signal $S_{Ei}$, and the third frequency domain signal $S_{Si}$, wherein i=1, 2, . . . , or n, the first voice feature is used to represent a de-reverberation degree of the second frequency domain signal $S_{Ei}$, and the second voice feature is used to represent a noise reduction degree of the third frequency domain signal $S_{Si}$; and determining a fused frequency domain signal corresponding to the first frequency domain signal $S_i$ based on the M target amplitude values.

11. The electronic device according to claim 10, wherein the obtaining M target amplitude values corresponding to the first frequency domain signal $S_i$ based on the first voice feature, the second voice feature, the second frequency domain signal $S_{Ei}$, and the third frequency domain signal $S_{Si}$ specifically comprises:

when it is determined that the first voice feature and the second voice feature that correspond to a frequency $A_i$ in the M frequencies meet a first preset condition, determining a first amplitude value corresponding to a frequency $A_i$ in the second frequency domain signal $S_{Ei}$ as a target amplitude value corresponding to the frequency $A_i$, or determining the target amplitude value corresponding to the frequency $A_i$ based on the first amplitude value and a second amplitude value corresponding to a frequency $A_i$ in the third frequency domain signal $S_{Si}$, wherein i=1, 2, . . . , or M; or when it is determined that the first voice feature and the second voice feature that correspond to the frequency $A_i$ do not meet the first preset condition, determining the second amplitude value as the target amplitude value corresponding to the frequency $A_i$.

12. The electronic device according to claim 11, wherein the determining the target amplitude value corresponding to the frequency $A_i$ based on the first amplitude value and a second amplitude value corresponding to a frequency $A_i$ in the third frequency domain signal $S_{Si}$ specifically comprises:

determining a first weighted amplitude value based on the first amplitude value corresponding to the frequency $A_i$ and a corresponding first weight, and determining a second weighted amplitude value based on the second amplitude value corresponding to the frequency $A_i$ and a corresponding second weight; and determining a sum of the first weighted amplitude value and the second weighted amplitude value as the target amplitude value corresponding to the frequency $A_i$.

13. The electronic device according to claim 11, wherein the first voice feature comprises a first dual-microphone correlation coefficient and a first frequency energy value, and the second voice feature comprises a second dual-microphone correlation coefficient and a second frequency energy value; and the first dual-microphone correlation coefficient is used to represent a signal correlation degree between the second frequency domain signal $S_{Ei}$ and a second frequency domain signal $S_{Et}$ at corresponding frequencies, the second frequency domain signal $S_{Et}$ is any channel of second frequency domain signal $S_E$ other than the second frequency domain signal $S_{Ei}$ in the n channels of second frequency domain signals $S_E$, the second dual-microphone correlation coefficient is used to represent a signal correlation degree between the third frequency domain signal $S_{Si}$ and a third frequency domain signal $S_{St}$ at corresponding frequencies, and the third frequency domain signal $S_{St}$ is a third frequency domain signal $S_s$ that is in the n channels of third frequency domain signals $S_s$ and that corresponds to a same first frequency domain signal as the second frequency domain signal $S_{Et}$.

14. The electronic device according to claim 13, wherein the first preset condition is that the first dual-microphone correlation coefficient and the second dual-microphone correlation coefficient of the frequency $A_i$ meet a second preset condition, and the first frequency energy value and the second frequency energy value of the frequency $A_i$ meet a third preset condition.

15. The electronic device according to claim 14, wherein the second preset condition is that a first difference of the first dual-microphone correlation coefficient of the frequency $A_i$ minus the second dual-microphone correlation coefficient of the frequency $A_i$ is greater than a first threshold; and the third preset condition is that a second difference of the first frequency energy value of the frequency $A_i$ minus the second frequency energy value of the frequency $A_i$ is less than a second threshold.

16. The electronic device according to claim 10 wherein a de-reverberation processing method comprises a de-reverberation method based on a coherent-to-diffuse power ratio or a de-reverberation method based on a weighted prediction error.

17. The electronic device according to claim 10, wherein when the one or more processors execute the computer instructions, the electronic device is enabled to further perform the following steps:

performing inverse Fourier transform on the fused frequency domain signal to obtain a fused voice signal.

18. The electronic device according to claim 10, wherein when the one or more processors execute the computer instructions, the electronic device is enabled to further perform the following steps:

before the Fourier transform is performed on the voice signals, displaying a shooting interface, wherein the shooting interface comprises a first control;

detecting a first operation performed on the first control; and in response to the first operation, performing, by the electronic device, video shooting to obtain a video that comprises the voice signals.

19. The electronic device according to claim 10, wherein when the one or more processors execute the computer instructions, the electronic device is enabled to further perform the following steps:

before the Fourier transform is performed on the voice signals, displaying a recording interface, wherein the recording interface comprises a second control;

detecting a second operation performed on the second control; and in response to the second operation, performing, by the electronic device, recording to obtain the voice signals.

20. A non-transitory computer-readable storage medium, storing a computer program, wherein the computer program, when executed on an electronic device, causes the electronic device to perform following operations:

performing Fourier transform on voice signals picked up by the n microphones to obtain n channels of corresponding first frequency domain signals S, wherein each channel of first frequency domain signal S has M frequencies, and M is a quantity of transform points used when the Fourier transform is performed;

performing de-reverberation processing on the n channels of first frequency domain signals S to obtain n channels of second frequency domain signals $S_E$, and performing noise reduction processing on the n channels of first frequency domain signals S to obtain n channels of third frequency domain signals $S_s$;

determining a first voice feature corresponding to M frequencies of a second frequency domain signal $S_{Ei}$ corresponding to a first frequency domain signal $S_i$ and a second voice feature corresponding to M frequencies of a third frequency domain signal $S_{Si}$ corresponding to the first frequency domain signal $S_i$, and obtaining M target amplitude values corresponding to the first frequency domain signal $S_i$ based on the first voice feature, the second voice feature, the second frequency domain signal $S_{Ei}$, and the third frequency domain signal $S_{Si}$, wherein i=1, 2, . . . , or n, the first voice feature is used to represent a de-reverberation degree of the second frequency domain signal $S_{Ei}$, and the second voice feature is used to represent a noise reduction degree of the third frequency domain signal $S_{Si}$; and determining a fused frequency domain signal corresponding to the first frequency domain signal $S_i$ based on the M target amplitude values.

* * * * *